(12) United States Patent
Trunz et al.

(10) Patent No.: US 6,191,898 B1
(45) Date of Patent: Feb. 20, 2001

(54) OPTICAL IMAGING DEVICE, PARTICULARLY AN OBJECTIVE, WITH AT LEAST ONE OPTICAL ELEMENT

(75) Inventors: Michael Trunz, Pfahlheim; Ralf Hilgers, Aalen; Erich Merz, Essingen; Michael Mühlbeyer, Aalen, all of (DE)

(73) Assignee: Carl-Zeiss-Stiftung (DE)

( * ) Notice: Under 35 U.S.C. 154(b), the term of this patent shall be extended for 0 days.

(21) Appl. No.: 09/483,320

(22) Filed: Jan. 14, 2000

(30) Foreign Application Priority Data

Jan. 15, 1999 (DE) .............................................. 199 01 295

(51) Int. Cl.⁷ ..................................................... G02B 7/02
(52) U.S. Cl. ................................................................ 359/819
(58) Field of Search .................................... 359/808, 813, 359/819, 821, 822

(56) References Cited

U.S. PATENT DOCUMENTS

| | | | |
|---|---|---|---|
| 4,017,878 | * 4/1977 | Hagiwara | 385/139 |
| 4,162,120 | * 7/1979 | Moreno | 359/820 |
| 4,929,073 | 5/1990 | La Plante et al. | 359/848 |
| 5,117,311 | 5/1992 | Nomura | 359/819 |
| 5,160,112 | 11/1992 | Pritchard et al. | 248/604 |
| 5,428,482 | 6/1995 | Bruning et al. | 359/827 |
| 5,523,893 | 6/1996 | Haas | 359/820 |
| 5,638,223 | 6/1997 | Ikeda | 359/827 |
| 5,822,133 | 10/1998 | Mizuno et al. | 359/696 |

FOREIGN PATENT DOCUMENTS 0 243 893 B1   4/1987 (EP) .

* cited by examiner

*Primary Examiner*—Ricky Mack

(57) ABSTRACT

An optical imaging device, particularly an objective, is provided with at least one optical element, which is mounted in an inner ring, the inner ring being connected to an outer mount. A manipulator device serves for the displacement of the optical element in at least one direction that is perpendicular to the optical axis. By a system of peripheral slots between the inner ring and the outer mount with connecting members situated therebetween, a rotary joint between the inner ring and the outer mount, and at least one displacing rotary joint with an adjusting member between the inner ring and the outer mount as the manipulator device, a displacement of the optical element is attained with low deformation or controlled deformation of the optical element. The inner ring and the outer mount are preferably constituted monolithically.

12 Claims, 2 Drawing Sheets

OPTICAL IMAGING DEVICE, PARTICULARLY AN OBJECTIVE, WITH AT LEAST ONE OPTICAL ELEMENT

BACKGROUND OF THE INVENTION

1. Field of the Invention

The invention relates to an optical imaging device, particularly an objective, with at least one optical element, which is mounted in an inner ring, the inner ring being connected to an outer mount, and with a manipulator device for the displacement of the optical element in at least one direction that is perpendicular to the optical axis.

2. Discussion of Relevant Art

From European Patent EP 243 893 81, a lens mount is known with a lens as the optical element that is elastically connected to a mount element such that different expansions of the individual elements arising due to temperature differences or temperature fluctuations, can be compensated. In particular, radial movements or radial expansions are thereby compensated, but a central position is nevertheless to be maintained.

U.S. Pat. No. 5,248,482 shows a deformation decoupling of a lens from a mount.

From U.S. Pat. No. 5,638,223, an objective is known in which lens tilting is possible.

In the assembly of an optical imaging device, e.g. an objective, which consists of a number of parts and several optical elements, mechanical manufacturing tolerances necessarily arise. During assembly, these tolerances, such as unevennesses of the individual parts, are summed. In particular, there is a risk of large unevennesses at the seating of the optical element such as, for example, a lens.

For the compensation of these manufacturing tolerances, it is known to move one or more optical elements on the x-axis or y-axis, i.e., on one or both axes perpendicular to the optical axis. Known manipulator devices for the displacement of the optical element consist, in general, of an outer mount, a manipulator ring, and an inner mount or an inner ring which supports the optical element.

SUMMARY OF THE INVENTION

The present invention therefore has as its object to improve an optical imaging device of the kind mentioned at the beginning, such that, for the compensation of imaging errors, an optical element is displaceable in a defined manner in at least one direction that is perpendicular to, or at an optionally selected angle to, the optical axis, such that the path-controlled displacement can be carried out very accurately, with a construction that is optimized for force flux and rigidity, with a marked reduction of the surface deformation of the optical element.

This object is attained according to the invention by an optical imaging device comprising: an outer mount, an inner ring connected to said outer mount, at least one optical element mounted in said inner ring, a manipulator device comprising at least one adjusting rotary joint or hinge with an adjusting member between said inner ring and said outer mount for path-controlled displacement of said optical element in at least one direction that is perpendicular to the optical axis of the imaging device or which is situated at an optionally selected angle to said optical axis, a system of peripheral slots between said inner ring and said outer mount with connecting members situated therebetween, and a rotary joint or hinge between said inner ring and said outer mount, whereby displacement of said optical element is attained with low deformation or controlled deformation of the optical element.

By means of the solution according to the invention, there takes place an integration of the heretofore three components, namely the outer mount, inner ring, and manipulator ring, into a single component, in particular when the inner ring and outer mount are constituted monolithically. Substantial advantages thereby accrue in weight saving and a smaller constructional space, and also thereby resulting in higher natural frequencies.

The reduction of parts leads on the one hand to cost savings and on the other hand also to a corresponding saving of time during mounting. A better rigidity arrangement is in addition obtained in this manner, connected with a reduction of the surface deformation of the optical element. Tolerances, particularly surface tolerances, can furthermore be reduced in this manner.

With the imaging device according to the invention, general corrections of imaging errors of the objective can also be effected, in order correspondingly to precisely compensate them.

A resilience, or possibility of movement in the x- and y-directions, is attained by means of the connecting members which provide an elastic or resilient connection between the outer mount and the inner ring; however, rigidity is simultaneously given in the z-direction, i.e., in the direction of the optical axis.

BRIEF DESCRIPTION OF THE DRAWINGS

Advantageous designs and developments will become apparent from the embodiment example which is described in principle hereinbelow with reference to the schematic drawings, in which.

DETAILED DESCRIPTION OF PREFERRED EMBODIMENTS

Figure 1:
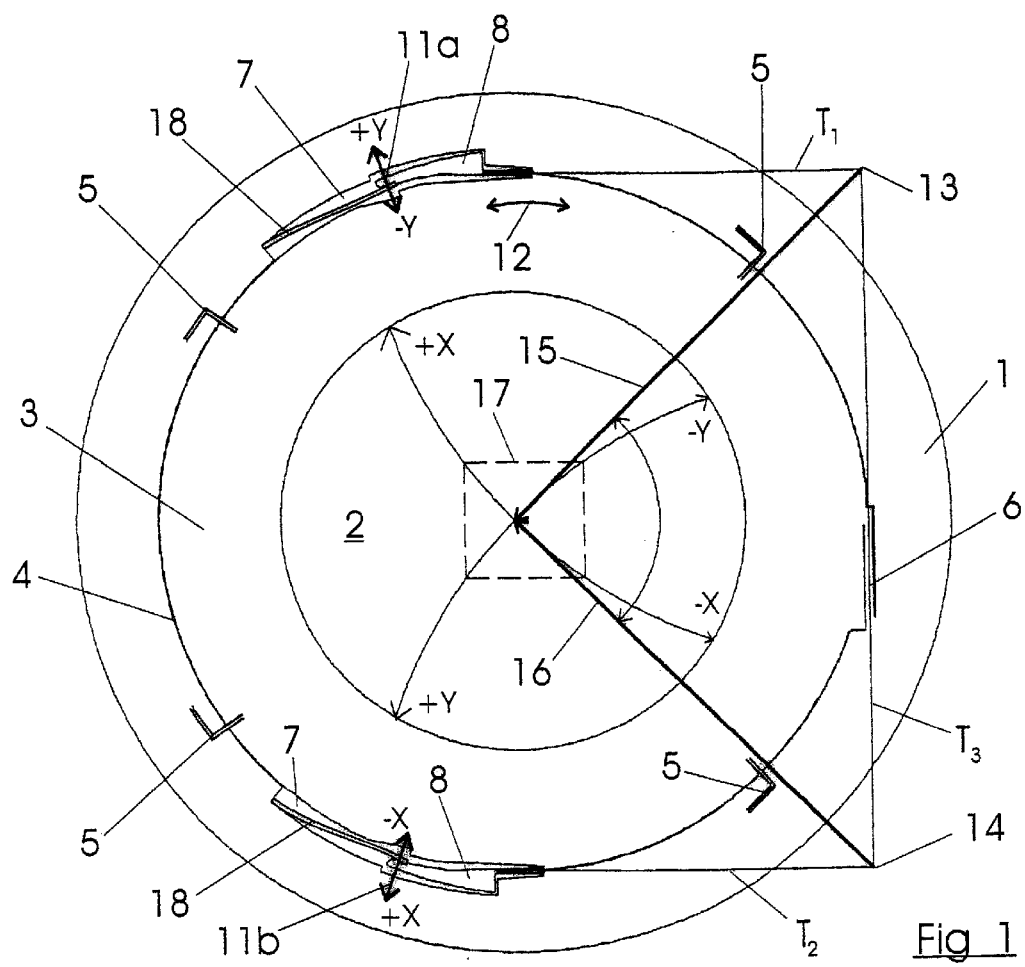
FIG. 1 shows as the optical imaging device an optical element of an objective with the mounting according to the invention, in plan view.
Figure 2:
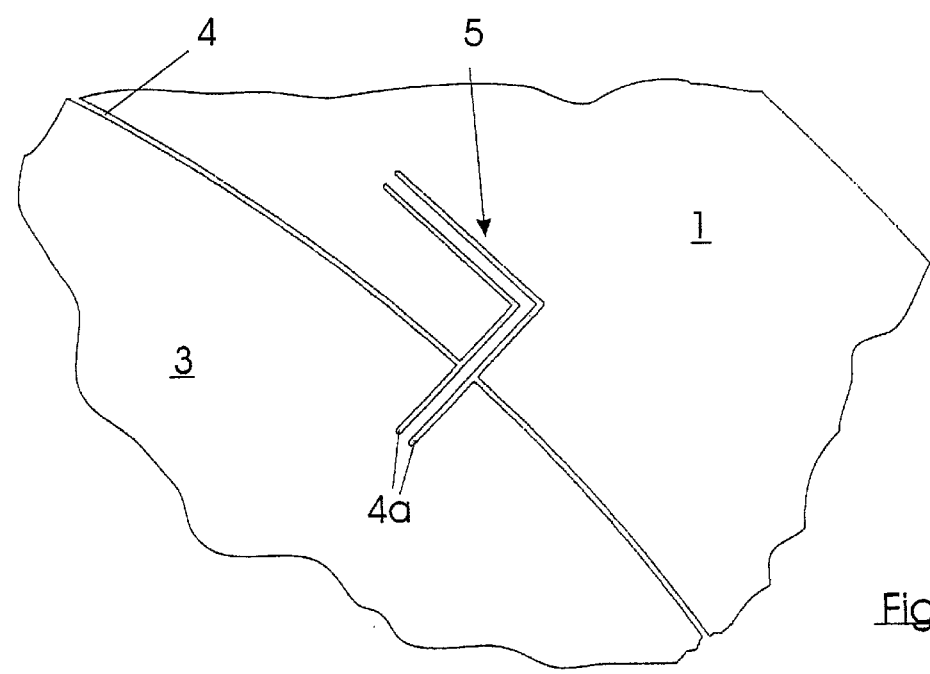
FIG. 2 shows an enlarged detail of FIG. 1, with an L-shaped connecting joint between the inner ring and the outer mount.
Figure 3:
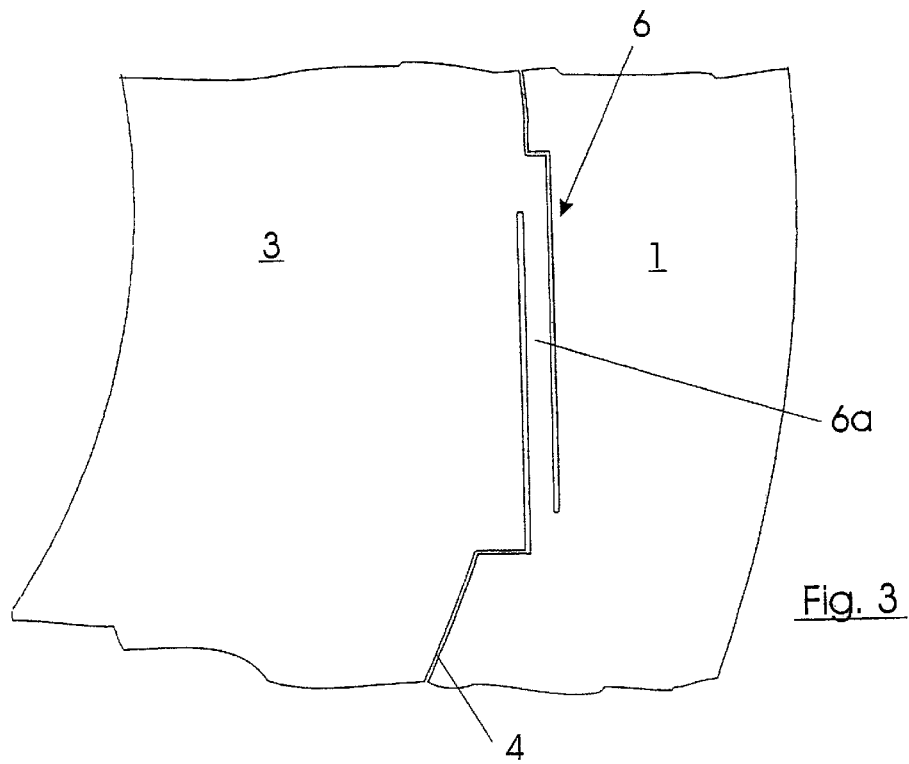
FIG. 3 shows an enlarged detail of FIG. 1, with a rotary joint between the inner ring and the outer mount.

FIG. 1 shows, in a plan view, an outer mount 1 of an optical imaging device, e.g., an objective, with a lens 2 as the optical element which is supported by an inner ring 3 by means of clips. The outer mount 1 and the inner ring 3 are constituted monolithically, a resilient connection between the inner ring 3 and the outer mount 1 being provided by a system of peripheral slots 4 between the inner ring 3 and the outer mount 1, with L-shaped connecting members 5 situated in between them. The connecting members 5 are constituted as solid joints and are installed by erosion in the inner ring 3 and the outer mount 1. The L-shaped connecting members 5, the arrangement of which is clearly apparent from FIG. 2, represent, besides a rotary joint or hinge 6 and adjusting rotary joints or hinges 8, 9, 10, the single connection between the inner ring 3 and the outer mount 1. The peripheral slots 4, which are installed by parting cuts in the one-piece basic form, are interrupted at regular intervals by means of two L-shaped parting cuts arranged adjacently at a small spacing, so that the connecting members 5 are formed as webs between the L-shaped cuts. In the enlarged illustration of the rotary joint 6 in FIG. 3, it can be seen that the rotary joint or hinge 6 is likewise formed by an offset and an overlapping of the peripheral slot 4, the rotary joint being formed by a web 6a between the peripheral slots 4, which overlap each other in this region. Instead of an integral nature of the inner ring 3 and outer mount 1, the connection can also take place by means of solid joints in the form of welded-in, adhered, or soldered components.

Figure 4:
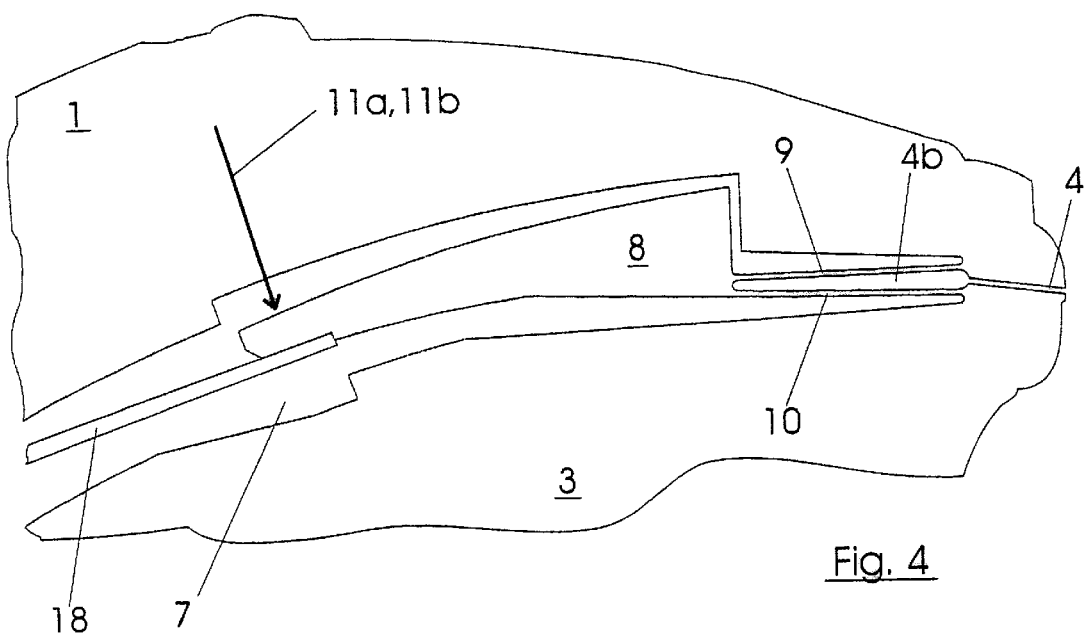
FIG. 4 shows an enlarged detail of FIG. 1 of an adjusting lever for the displacement of the inner ring with the optical element relative to the outer mount.

The peripheral slots 4 are interrupted at two opposite places with the formation of a larger recess 7 between the outer mount 1 and the inner ring 3. A respective adjusting lever 8 is arranged in each of the two recesses 7 (see as a whole the enlarged illustration in FIG. 4), and is connected to the outer mount 1 by means of a lever arm 9 and to the inner ring 3 by means of a further lever arm 10, and thus forms an adjustment joint. The two lever arms 9 and 10 produce a slot 4b between them, as an extension of a peripheral slot 4. As an adjusting member, an adjusting screw, represented only by an arrow 11a or 11b, engages in a radial direction the end of each adjusting lever 8 remote from the two lever arms 9 and 10, and forms a manipulator device for the displacement of the inner ring 3 relative to the outer mount 1. For this purpose, the screw 11a or 11b is inserted into a threaded bore of the outer mount 1. If the screw 11a or 11b is displaced, there results via the lever arm 10 a displacement of the inner ring 3 in the direction of the arrow 12 relative to the outer mount 1. The manipulator device is constituted as a construction which optimizes force flux and reliability.

In order to now attain a desired and predetermined displacement of the inner ring 3 relative to the outer mount 1 in the x,y-plane, the following conditions or allocations are to be adhered to:

The rotary joint or hinge 6 is to be arranged between the two contact points of the adjusting levers 8 for the displacement of the inner ring 3, such that the tangents $T_1$ and $T_2$ at the contact points of the adjusting lever 8 intersect the tangent $T_3$ constructed at the rotary joint 6. The two intersection points then form, on the one hand, a center of revolution 13 for the screw 11b for the displacement of the inner ring 3 in the x-direction and on the other hand a center of revolution 14 for the displacement of the inner ring 3 in the y-direction by means of the screw 11a. At the same time, the two radials 15 and 16 from the center of revolution 13 or the center of revolution 14 to the midpoint or to the z-axis have to stand perpendicular to each other. The two radials 15 and 16 thus form the two axes, the radial 16 defining the x-axis and the radial 15 defining the y-axis.

Upon an adjustment of the x-adjusting screw 11b, the inner ring 3 thus turns around the center of revolution 13; upon an adjustment of the y-adjusting screw 11a, the inner ring 3 is turned around the center of revolution 14. This means that, strictly speaking, no linear x- or y-movement would be given, but since the radii of the radials 15 and 16 are substantially larger than the adjusting movement which is intended, there results in a movement field 17 (see the dashed representation in FIG. 1) a quasi-linear movement in the x,y-plane. For the return of the adjusting movements by means of the adjusting levers 8 and to increase the stiffness for additional and special loads, leaf springs 18 can if necessary engage on the inner periphery of the displacement lever 8, and are supported by their other ends on the outer mount 1. The adjusting lever 8 can be moved with the adjusting screw 11a or 11b in radial direction, by which the contact point of the inner lever arm 10 with the inner ring 3 will be moved at least approximately in tangential direction, while the contact point of the outer lever arm 9 with the outer mount 1 remains fixed to the outer mount 1. So the displacement movement of the inner ring 3 takes place in the peripheral direction 12. The lever arms 9 and 10 act as (lever) gears.

A high elasticity in the plane perpendicular to the optical axis (z-axis) is obtained by the arrangement and formation of the peripheral slot 4 and of the connecting members 5. Furthermore, a high rigidity in the z-direction is thereby given. This depends, among other things, on the L-shape of the connecting member 5, which can have a corresponding length in the z-direction and correspondingly insure a high rigidity in the z-direction. The rotary joint or hinge 6 in the embodiment example represents a solid rotary joint, just as much as the connecting member 5 does. However, other kinds of rotary joint are of course possible for the realization of a displacement of the inner ring 3 relative to the outer mount 1.

In the case that no ability to move at right angles is desired, the above-stated allocations of the centers of rotation 13, 14 and of the rotary joint 6 can also take place in other ways.

The transmission ratio can be set by the length and angular arrangement of the levers 9 and 10.

LIST OF REFERENCE NUMBERS

1 outer mount
2 optical element
3 inner ring
4 peripheral slot
4a (Erosion slot)
4b peripheral slot
5 connecting member
6 rotary joint
6a web
7 recess
8 adjusting lever
9 lever arm
10 lever arm
11a arrow (adjusting screw/y-screw)
11b arrow (adjusting screw/ x-screw)
12 direction of movement
13 center of revolution
14 center of revolution
15 radial
16 radial
17 movement field
18 leaf springs
$T_1$ tangent
$T_2$ tangent
$T_3$ tangent

We claim:

1. An optical imaging device comprising:
   an outer mount,
   an inner ring connected to said outer mount,
   at least one optical element mounted in said inner ring,
   a manipulator device comprising at least one adjusting rotary joint or hinge (8, 9, 10) with an adjusting member (11a, 11b) between said inner ring (3) and said outer mount (1) for path-controlled displacement of said optical element in at least one direction that is perpendicular to the optical axis of the imaging device or which is situated at an optionally selected angle to said optical axis,
   a system of peripheral slots (4) between said inner ring (3) and said outer mount (1) with connecting members (5) situated therebetween, and a rotary joint or hinge (6) between said inner ring (3) and said outer mount (1), whereby displacement of said optical element (2) is attained with low deformation or controlled deformation of said optical element (2).

2. The optical imaging device according to claim 1, wherein said inner ring (3) and said outer mount (1) are constituted monolithically.

3. The optical imaging device according to claim 1, comprising two adjusting rotary joints with adjusting levers (8) for displacement in two mutually perpendicular axes (x- and y-axes), and respectively possessing centers of revolution (13,14) formed by intersection points of tangents (T1, T2) at respective adjusting rotary joints (8, 9, 10) with a tangent T3 at said rotary joint (6) situated therebetween.

4. The optical imaging device according to claim 3, wherein radials (15,16) from said centers of revolution (13,14) to a z-axis are perpendicular to, or at an optionally selected angle to, said optical axis.

5. The optical imaging device according to claim 1, wherein said connecting members (5) are formed by parting cuts with webs therebetween, said connecting members (5) being distributed over the periphery of said slot (4) between said inner ring (3) and said outer mount (1).

6. The optical imaging device according to claim 1, wherein said at least one manipulator device comprises, as adjusting members, adjusting screws (11a, 11b) that engage on adjusting levers (8).

7. The optical imaging device according to claim 6, wherein said adjusting levers (8) are each provided with two lever arms (9, 10) at one end, one lever arm (9) being connected to said outer mount (1) and the other lever arm (10) being connected to said inner ring (3), and forming a slot (4b) therebetween; and a respective adjusting screw (11, 11b) engages in a radial direction on an associated adjusting lever (8) at an end of said associated adjusting lever (8) remote from said two lever arms (9, 10).

8. The optical imaging device according to claim 7, wherein said slot (4b) between said two lever arms (9, 10) forms an extension of a said peripheral slot (4).

9. The optical imaging device according to claim 1, wherein at least one of said connecting members (5) and said rotary joint (6) is constructed as a solid joint.

10. The optical imaging device according to claim 1, wherein said connecting members (5) are formed by separate components.

11. The optical imaging device according to claim 1, wherein said rotary joint comprises an adjusting lever (8) with a return member (18).

12. The optical imaging device according to claim 11, wherein said return member comprises a leaf spring (18).

* * * * *